United States Patent

Keller et al.

[15] 3,705,362

[45] Dec. 5, 1972

[54] ASTABLE MULTIVIBRATOR CONTAINING TWO COMPLEMENTARY TRANSISTORS

[72] Inventors: Hans Keller; Wolfgang Sauer, both of Freiburg, Germany

[73] Assignee: ITT Industries, Inc., New York, N.Y.

[22] Filed: Dec. 22, 1971

[21] Appl. No.: 210,700

[30] Foreign Application Priority Data

Jan. 16, 1971 Germany....................P 21 02 025.7

[52] U.S. Cl.................331/111, 331/108 A, 331/113

[51] Int. Cl...............................................H03k 3/26

[58] Field of Search..................331/108 A, 111, 113

[56] References Cited

UNITED STATES PATENTS 3,553,495 1/1971 Shaugnessy .........................331/111

*Primary Examiner*—John Kominski

*Attorney*—C. Cornell Remsen et al.

[57] ABSTRACT

This invention relates to an astable multivibrator provided with two complementary transistors and an additional transistor which discharges the capacitor at a definite time independent of the current gain of said two complementary transistors. Applicable in one-coil electronic clock circuits.

3 Claims, 4 Drawing Figures

INVENTORS
HANS KELLER
WOLFGANG SAUER
BY Vincent B. Ingrassia
AGENT

INVENTORS
HANS KELLER
WOLFGANG SAUER
BY Vincent B. Ingrassia
AGENT

ASTABLE MULTIVIBRATOR CONTAINING TWO COMPLEMENTARY TRANSISTORS

BACKGROUND OF THE INVENTION

The present invention relates to an astable multivibrator comprising two complementary transistors, with an operating impedance being arranged between the collector of the one transistor, the driving transistor, and the voltage-conducting pole of the source of supply voltage. The base of the other transistor, i.e. of the control transistor, is connected via a capacitance, to the collector of the driving transistor as well as, across an ohmic resistor, to the zero voltage point of the circuit. The collector of the control transistor is connected to the base of the driving transistor either directly or across an ohmic resistor, and finally, the emitter of the control transistor is applied, across a resistor, to the voltage-conducting pole of the source of supply voltage, and the emitter of the driving transistor is applied to the zero voltage point of the circuit.

It is a property of those multivibrators containing complementary transistors that, unlike the multivibrators containing transistors of the same conductivity type, both transistors are switched on in the one switching state, i.e. a current is flowing through both transistors while in the other switching state both transistors are switched off, i.e. practically no current is flowing. In the switched-on state a capacitor is discharged across the base-emitter path of the control transistor and across the emitter resistor thereof, until the collector current of the control transistor is no longer sufficient for supplying the base current required for driving the driving transistor into saturation. Upon reaching this limit, the multivibrator automatically changes over into the other switching state. Owing to this control mechanism the switching time position is very strongly dependent upon the respective dc gain factor of the two transistors, thus causing the pulse repetition frequency and the pulse duty factor, in the case of a series production of such circuits, to be subjected to considerable deviation in values.

SUMMARY OF THE INVENTION

It is an object of the present invention to avoid the above described disadvantage, i.e. of amending the circuit of the aforementioned type of astable multivibrator in such a way that switching over into the respective other switching state, and independently of the spread between units relating to the employed transistors, is always effected at the same definite time position.

According to a broad aspect of the invention there is provided an astable multivibrator comprising a source of supply voltage, a capacitor, a first resistor, a second resistor, a first driving transistor having an emitter, base and collector, said emitter coupled to the zero point of the circuit, an operating impedance coupled to the collector of said driving transistor and to said source of supply voltage, a second control transistor having an emitter, base and collector, said base being coupled via said capacitor to the collector of said driving transistor and coupled across said first resistor to the zero point of the circuit, said collector being coupled to the base of said driving transistor, and said emitter being coupled across said second resistor to said source of supply voltage, a third transistor of the same conductivity type as said control transistor, having a base, emitter and collector, said emitter of said third transistor coupled to the emitter of said control transistor, said collector of said third transistor coupled to the base of said control transistor, and said base of said third transistor coupled to the collector of said driving transistor.

The above and other objects of the present invention will be better understood from the following detailed description taken in conjunction with the accompanying drawings, in which:

DESCRIPTION OF THE PREFERRED EMBODIMENT

Figure 1:
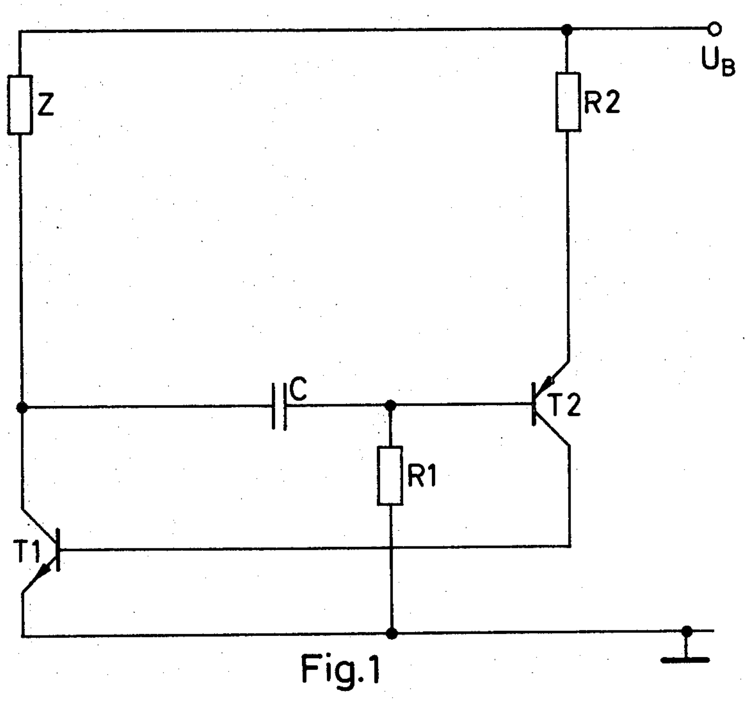
FIG. 1 is a schematic diagram of a conventional multivibrator.

An astable multivibrator of the conventional type is shown in FIG. 1 of the accompanying drawings. In this drawing, the driving transistor is indicated by the reference T1, the control transistor by T2, the capacitance by C, the operating impedance by Z, the resistor as applied to the base of the control transistor by R1, and the resistor arranged in the emitter circuit of the control transistor by R2. For the operating impedance Z, it is possible to use either ohmic resistors or inductances.

Figure 2:
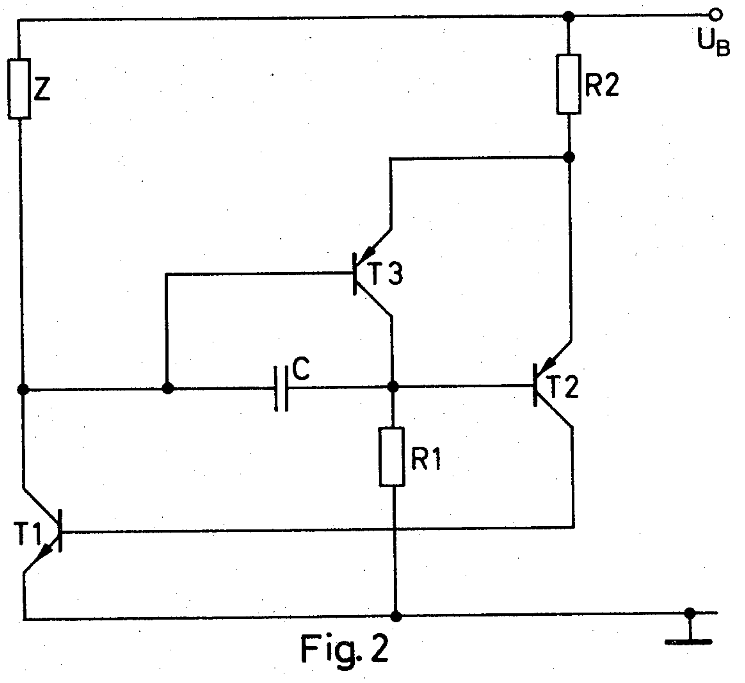
FIG. 2 is a schematic diagram of one embodiment of the inventive multivibrator.

FIG. 2 shows the circuit of a multivibrator improved in the inventive way. Parallel in relation to the base-emitter path of the control transistor T2 there is connected the collector emitter path of an additional transistor T3 which is of the same conductivity type as the control transistor, with the emitter of the additional transistor T3 being connected to the emitter of the control transistor T2, and with the collector of the additional transistor being connected to the base of the control transistor. According to this embodiment it will be seen that the base of the additional transistor is applied directly to the collector of the driving transistor T1.

By inserting the additional transistor the circuit respectively changes automatically into the non-conducting state of both the control and the driving transistor whenever, by the increased discharge of the capacitor C caused by the base current of T2, the base voltage of the control transistor T2 reaches the same value as the base voltage of the additional transistor T3 which then becomes conductive, so that the base-emitter path of the control transistor is short-circuited and, in consequence of this, the control transistor is blocked, i.e. rendered non-conductive. When taking the curve as a function of time of the voltage appearing at the capacitor C and with respect to the collector of the driving transistor T1 as a reference point, and with respect to the collector of the additional transistor T3 as a measuring point, it will be seen that in the case of FIG. 2, the additional transistor is rendered conductive as soon as the voltage appearing at the capacitor has almost become zero.

Figure 3:
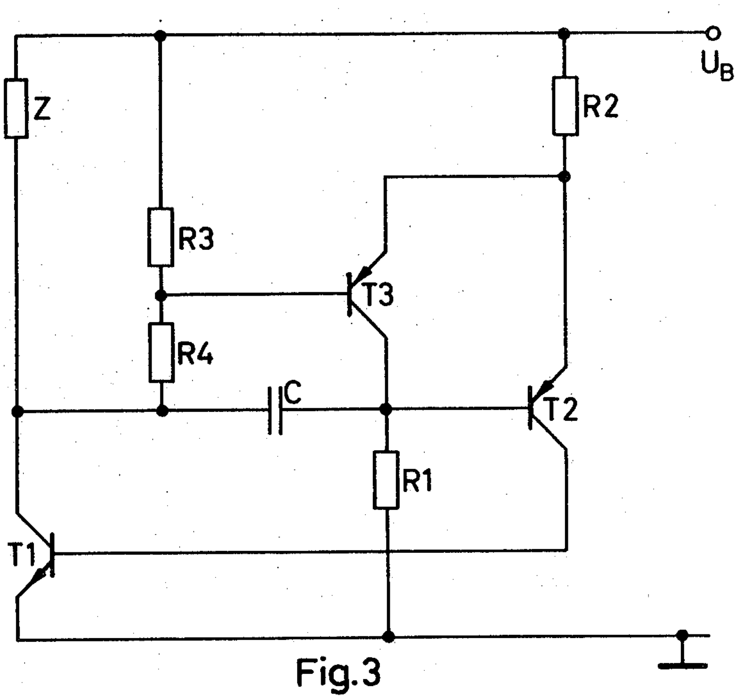
FIGS. 3 and 4 are schematic diagrams of further embodiments of the inventive multivibrator.
Figure 4:
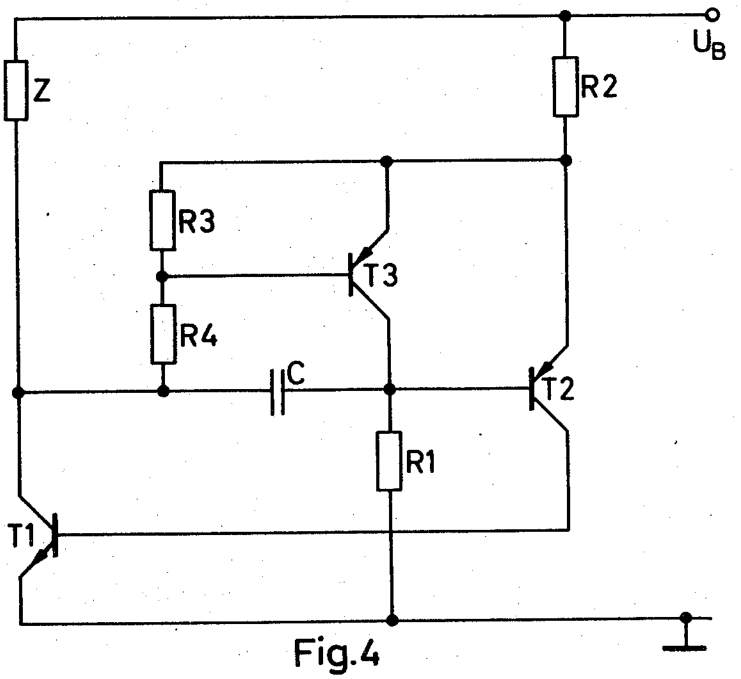

FIGS. 3 and 4 show modified embodiments of the inventive multivibrator in which, just as in FIG. 2, the additional transistor T3 is contained in the same way, with the base electrode thereof, however, being connected to the tapping point of the voltage divider composed of the ohmic resistor R3 and R4, with this voltage divider, on one hand, being connected to the collector of the driving transistor and, on the other hand, to the voltage-conducting pole of the source of supply voltage $U_B$, or else to the emitter of the additional transistor T3. By correspondingly dimensioning the resistors R3 and R4 it is possible to discharge (or reverse the charge of) the capacitor C beyond the zero voltage, in order thus to enlarge the switch-on time of the multivibrator.

Moreover in the case of multivibrators of the inventive type operated with a coil serving as the operating impedance, it may be of advantage to insert additional ohmic resistors and/or diodes polarized in the forward direction, in one or more lead-in conductors of the three transistors, in order thus either to utilize or to suppress effects which are due to the energy-storing property of the coil inductance.

It is to be understood that the foregoing description of specific examples of this invention is made by way of example only and is not to be considered as a limitation on its scope.

We claim:

1. An astable multivibrator comprising:
a source of supply voltage;
a capacitor;
a first resistor;
a second resistor;
a first driving transistor having an emitter, base and collector, said emitter coupled to the zero point of the circuit;
an operating impedance coupled to the collector of said driving transistor and to said source of supply voltage;
a second control transistor having an emitter, base and collector, said base being coupled via said capacitor to the collector of said driving transistor and coupled across said first resistor to the zero point of the circuit, said collector being coupled to the base of said driving transistor, and said emitter being coupled across said second resistor to said source of supply voltage;
a third transistor of the same conductivity type as said control transistor, having a base, emitter and collector, said emitter of said third transistor coupled to the emitter of said control transistor, said collector of said third resistor coupled to the base of said control transistor, and said base of said third transistor coupled to the collector of said driving transistor.

2. An astable multivibrator according to claim 1 further comprising:
an ohmic voltage divider having a tapping point coupled to the base of said third transistor and serving to couple the collector of said driving transistor to said source of supply voltage.

3. An astable multivibrator according to claim 1 further comprising an ohmic voltage divider having a tapping point coupled to the base of said third transistor and serving to couple the collector of said driving transistor to the emitter of said control transistor.

* * * * *